April 9, 1968　　　　M. N. WEBER　　　　3,377,002
CONSTANT PRESSURE FLUID SYSTEMS
Filed Sept. 15, 1966　　　　2 Sheets-Sheet 1

INVENTOR.
MILTON N. WEBER
BY
Dike, Thompson, & Bronstein
ATTORNEYS

April 9, 1968  M. N. WEBER  3,377,002
CONSTANT PRESSURE FLUID SYSTEMS
Filed Sept. 15, 1966  2 Sheets-Sheet 2

INVENTOR.
MILTON N. WEBER
BY
Dike, Thompson, & Bronstein
ATTORNEYS

United States Patent Office 3,377,002
Patented Apr. 9, 1968

3,377,002
CONSTANT PRESSURE FLUID SYSTEMS
Milton N. Weber, Dearborn, Mich., assignor to Barry Wright Corporation, Watertown, Mass., a corporation of Massachusetts
Filed Sept. 15, 1966, Ser. No. 579,708
2 Claims. (Cl. 222—333)

ABSTRACT OF THE DISCLOSURE

A storage system in which a diaphragm is interiorly positioned within a container and motor driven to maintain stored fluid under relatively constant pressure. The motor drive illustratively includes a rotating shaft within the container and in contact with a cluster of rollers in a housing affixed to the diaphragm. The axes of the rollers are mounted in the housing at an angle with respect to the shaft. Consequently, rotation of the shaft produces linear motion of the housing, and of the attached diaphragm, until the downward thrust of the housing is matched by the cumulative pressure effect against the diaphragm by the stored fluid.

---

This invention relates to fluid systems and, more particularly, to constant pressure fluid systems.

Systems which are used to store and dispense fluids are subject to loss of pressure. This loss comes about because of leakage at the seams of storage containers and at points of access to the fluid, such as inlet and outlet orifices. In addition, as fluid is withdrawn from storage, there is a tendency for pressure to diminish. In the case of gaseous fluids, this reduction comes about because the fluid remaining in storage expands, with a consequent lowering of pressure. In the case of liquid fluids, there is a reduction in pressure as the fluid volume becomes smaller. Nevertheless, it is often desirable to maintain stored fluids at relatively constant pressure.

Another characteristic of many fluid systems is that the withdrawal of fluid from storage is accompanied by a change in the rate of flow per unit of time. Such systems are unsatisfactory where it is desired to withdraw fluid at a constant rate; i.e. to effect the displacement of a stored fluid at a constant rate.

Accordingly, it is an object of the invention to facilitate the control of fluids in fluid handling systems. A related object is to control the dispensing and storage of fluids in fluid handling systems.

A further object of the invention is to provide constant pressure fluid systems. A related object is to maintain constant pressure storage in the presence of leakage. Another related object is to maintain constant pressure in the presence of reductions in fluid volume.

Still another object of the invention is to provide an accurate measure of the flow of fluid from a system, while maintaining constancy of pressure. A yet further object is to prevent transported fluid from sloshing about in its container.

In accomplishing the foregoing and related objects the invention provides a storage container with an interiorly positioned flexible diaphragm that is controlled by a transducer such as an actuator. The actuator may be motor driven to produce a constant pressure engagement of the diaphragm with stored fluid. Alternatively, the actuator may engage the diaphragm with the fluid to produce a constant rate of flow, i.e. fluid displacement, at an outlet.

In one embodiment of the invention the actuator is fixedly attached to the diaphragm and is acted upon by a motor-driven shaft that extends through the container and into the actuator. Included in the actuator are driving wheels which are angularly clustered about the shaft. The extent of engagement of the drive wheels with the shaft is controllable. Since the drive wheels of the actuator are inclined with respect to the shaft, rotation of the shaft has the effect, in the absence of slippage, produces a component of motion which linearly moves the actuator, and, hence, the diaphragm attached to it.

It is a feature of the invention that the diaphragm can be brought into engagement with the stored fluid with increasing pressure until a threshold level is reached where there is slippage between the shaft and the driving wheels and the actuator is brought to a standstill, i.e. stalls. As a result, the pressure of the fluid within the storage container is maintained relatively constant. As the pressure diminishes, either because of leakage or withdrawal of the stored fluid, the actuator moves to restore the equilibrium pressure condition. This arrangement may also be employed to prevent a fluid being transported from sloshing about in its container because of motion.

It is another feature of the invention that where the actuator driving wheels are adjusted so that there is no slippage, for anticipated working pressures, the system may be used to dispense the stored fluid at a constant rate.

Other aspects and features of the invention will be apparent after considering several illustrative embodiments, taken in conjunction with the drawings, in which.

Figure 1:
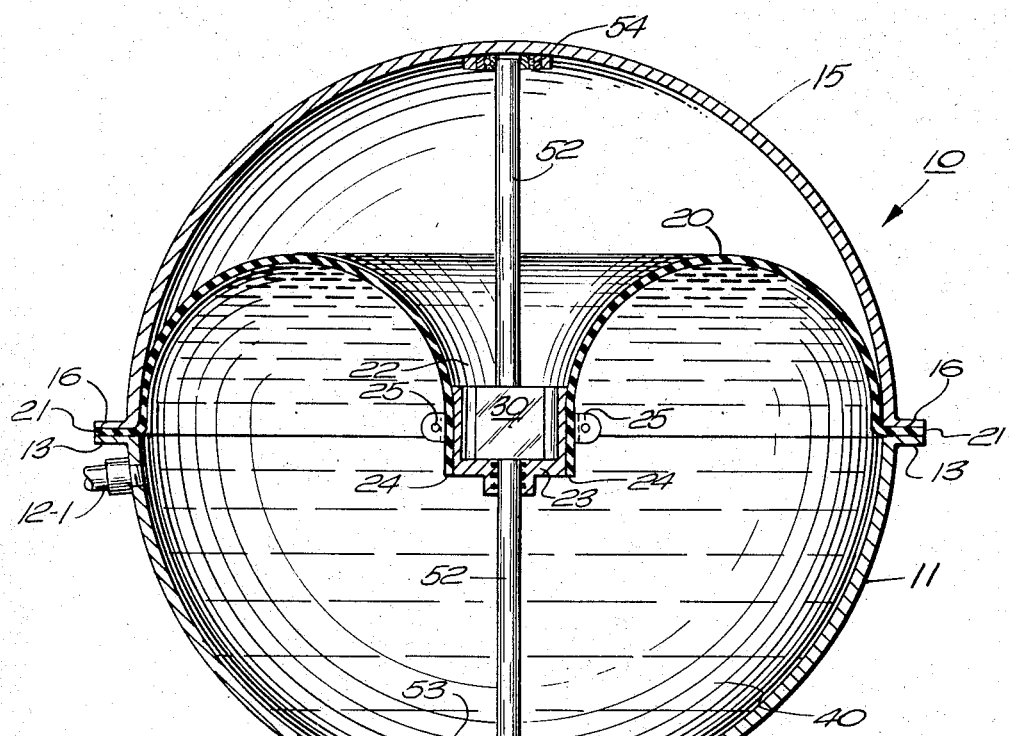
FIG. 1 is a cross-sectional view of a fluid system in accordance with the invention.

Turning to the drawings, the fluid system of FIG. 1 includes a storage reservoir 10 with an interiorly attached diaphragm or membrane 20. The membrane 20 is positioned by a motor driven actuator 30 with respect to a stored fluid 40 in order to maintain a preassigned pressure condition within the reservoir.

In construction, the container forming the reservoir 10 is desirably of a durable material, such as steel, and may be used to store both liquid and gaseous fluids. When used for the storage of special fluids, such as cryogenic materials for rocket propulsion, the material of the container is selected accordingly. As shown in FIG. 1, the overall container 10 is in two sections 11 and 15. The container 10 may take the form of a sphere for the storage of bulk fluids or, alternatively, an elongated cylinder for transporting bulk fluids from one location to another. Attached to the lower section 11 are an inlet port 12–1 and an outlet port 12–2. The container is supported in well known fashion (not shown) according to whether it is used for storage in transit or at a fixed location.

The diaphragm 20 is attached with respect to the interior of the container 10 by having its outer periphery 21 mounted between flanges 13 and 16 of the respective sections 11 and 15. The diaphragm 20 is secured to the flanges in conventional fashion to minimize leakage along the seam formed by the junction of the sections 11 and 15, as by having the flanges 13 and 16 bolted together at periodic intervals. Because of the flexibility of the diaphragm 20, it serves as a gasket seal along the seam between the sections 11 and 15. The diaphragm 20 is advantageously of a flexible material which is resistant to the fluid under storage.

For the fluid system of FIG. 1, the diaphragm 20 arches from its outer periphery 21 to a central aperture 22, where the actuator 30 is housed in a cylindrical cup 23. The cup 23 is, in turn, affixed to the diaphragm 20 at its inner periphery 24 by a clamp 25. The mode of attachment of the clamp 25 is illustrated in greater detail by FIG. 4. As in the case of the flange seal at the outer periphery 31 of the diaphragm, the clamp seal at the inner periphery 31 is relatively leak proof because of the gasketing effect of the diaphragm. In configuration, the diaphragm 20 of FIG. 1 is semi-toroidal and, as such, is telescopically adjustable with respect to the fluid 40 along the vertical axis of the actuator 30.

Figure 3:
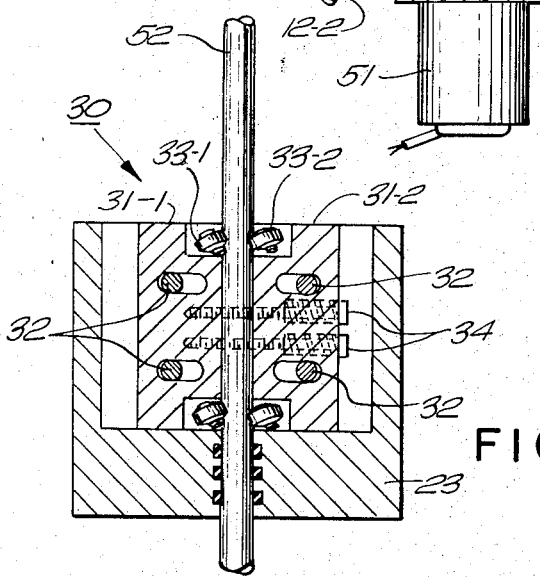
FIG. 3 is a side cross-sectional view of an actuator for the systems of FIGS. 1 and 2.

The actuator 30 is controlled by a drive unit 50, which includes a motor 51 and a shaft 52. Details of the interrelationship between the shaft 52 of the drive unit 50 and the actuator 30 are shown in FIG. 3 and described subsequently.

The shaft 52 of the driving system enters an aperture 14 in the base of the lower section 11 where it is housed in a bearing 53. The bearing 53 includes a set of concentric recesses for packing to prevent leakage. The shaft extends through the cup 23, in whose base there is anti-leakage packing similar to that provided in the bearing 53, to the interior roof of the container 10 where the shaft is pivoted in a suitable bearing 54. Driving the shaft is a conventional electrical motor 51 which is used to turn the shaft is either a clockwise or a counterclockwise direction. Since the central portion of the diaphragm 20 is attached to the actuator 30, any movement brought about by the rotation of the shaft 52 will produce a corresponding displacement of the diaphragm.

When the pressure exerted by the diaphragm 20 against the fluid 40 exceeds a threshold level, determined by an adjustment of the actuator as described subsequently, there is no further movement of the membrane, even though the shaft 52 continues to rotate. This is because of slippage between the actuator 30 and the shaft 52. Consequently, in this condition the actuator 30 is said to be "stalled." However, when the counterpressure exerted by the fluid 40 falls below the threshold level, the actuator 30 again operates to restore the original pressure condition. As a result, pressure is exerted by the diaphragm 20 against the stored fluid 40 tending to maintain relatively constant pressure at outlet point 12–2 as long as any drag effect by the diaphragm 20 is negligible. In addition, because the fluid is displaced by the action of the actuator 30 upon the diaphragm 20, there is a minimum void in the stored fluid, and a reduced tendency of the stored fluid to slosh during transportation.

Figure 4:
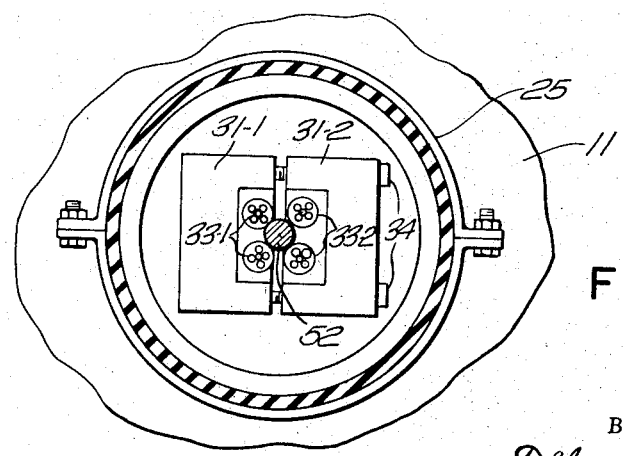
FIG. 4 is a plan cross-sectional view showing the disposition of the actuator of FIG. 3 in the systems of FIGS. 1 and 2.

The mechanism of the actuator 30, by which the diaphragm 20 is automatically and continuously disposed to assure a relatively constant pressure by the fluid 40, is more particularly described with reference to FIGS. 3 and 4. As shown in FIG. 3, the actuator 30 is positioned in a cup-like housing 23 with a suitable packing to prevent leakage of fluid from the interior of the tank during operation of the actuator. The actuator 30 includes two blocks 31–1 and 31–2 which are shown in plan view by FIG. 4. The blocks 31–1 and 31–2 of FIG. 3 are guided by studs 32 (not shown in FIG. 4) in elongated grooves. There are two such grooves in each block. In addition, each block has respective sets of angularly mounted rollers 33–1 and 33–2 in top and bottom recesses. The axes of the rollers 33–1 and 33–2 are fixedly mounted in the respective blocks 31–1 and 31–2. Taken collectively, the rollers 33–1 and 33–2 form clusters which angularly surround, and are in engagement with the shaft 52 at the top and bottom of the actuator 30. Because of the inclination of the rollers 33–1 and 33–2 with respect to the shaft, rotation of the latter propels the rollers, and hence the blocks 31–1 and 31–2 in which they are mounted, in the direction of the shaft axis. Such a device is a mechanical transducer by which a rotary input motion is converted into a rectilinear output motion. It has been used in the drive of textile loom shuttles and in the actuation of garage door openers. It eliminates the need for screw threading at the expense of slippage or stalling when there is insufficient frictional contact between the rollers 33–1 and 33–2 and the drive shaft 52 to overcome the resistance of the driven load.

The relative positions of the blocks 31–1 and 31–2 with respect to each other, and the shaft 52, and hence the extent of the frictional contact of the rollers with the shaft, is controlled by set screws 34. There are two set screws in all, as seen with reference to FIGS. 3 and 4. The screws are spring loaded to control the pressure applied to the shaft by the rollers. The rollers themselves have smooth surfaces, and being disposed at an angle with respect to the shaft, have a threading effect on the shaft. As the shaft rotates clockwise, for example, the actuator displaces the diaphragm 20 downwards until the pressure exerted against the diaphragm neutralizes the coefficient of friction between the rollers and the shaft. When this condition obtains, the actuator 30 is said to be stalled and although the shaft continues to rotate, there is no further displacement of the diaphragm 20 until there is a change in pressure of the stored fluid 40, either by leakage or by the deliberate withdrawal at the outlet 12–2. Thus the combination of the diaphragm and the motor-responsive actuator permits the storage of fluid at constant pressure in a bulk container in the face conditions that would otherwise lead to a lowering of pressure. In this sense, the invention provides a constant pressure storage system which is automatically maintained.

To replenish the contents of the container 10 the direction of rotation of the shaft 52 is reversed in conventional fashion, causing the membrane 20 to telescope in an upward direction and produce a void in the container 10. The resulting void is then filled by pumping fluid into the inlet orifice 12–1, after which the system is operated in the manner described previously.

Figure 2:
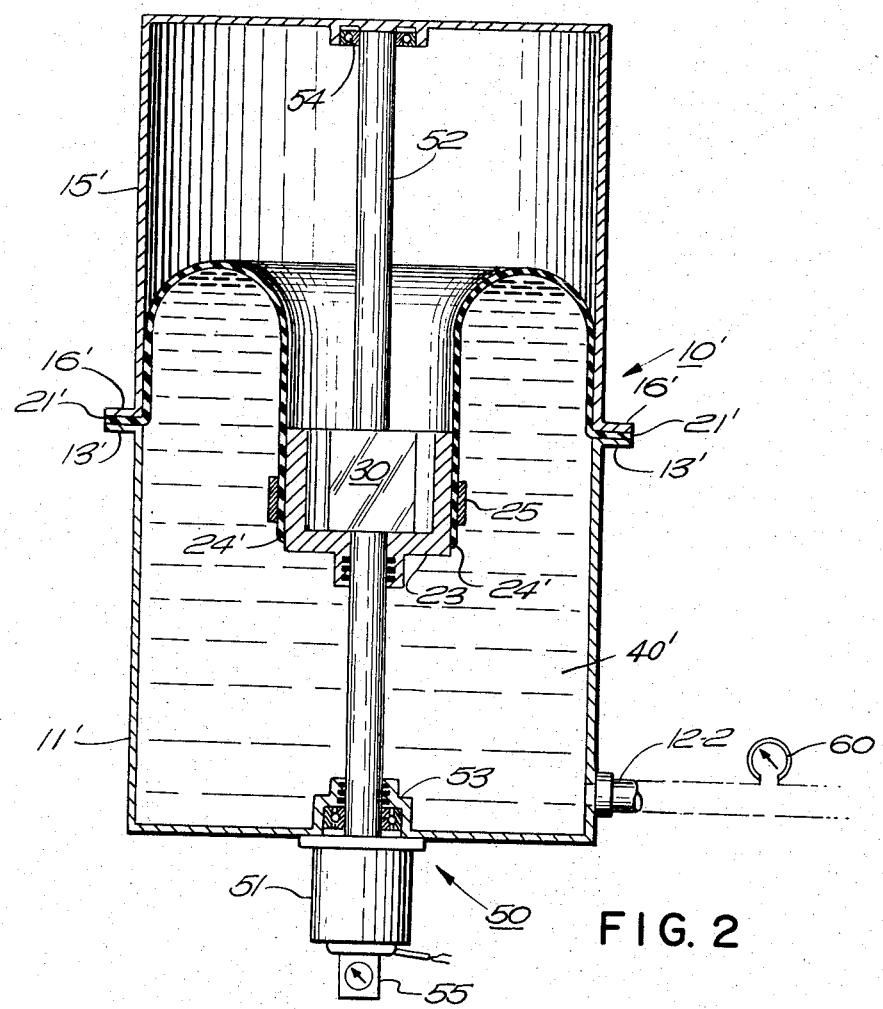
FIG. 2 is an alternative embodiment of a fluid system in accordance with the invention.

A further embodiment of the invention is shown in FIG. 2. This embodiment is particularly suitable to the storage of fluids in a gaseous state. The system of FIG. 2 employs two sections, 11′ and 15′, of a container 10′, similar to those of FIG. 1. The membrane 20′ is adapted in accordance with the configuration of the sections 11′ and 15′ to over-lie the fluid 40′. The remainder of the components and the operation of the system of FIG. 2 are similar to those of FIG. 1.

In addition, the system of FIG. 2 is illustratively adapted to operate as a constant displacement pump. For this mode of operation, the system includes a pressure gauge 60 connected to the outlet 12–2′ and a counter 55 of conventional design mounted on motor 51. In the actuator 30, the frictional force between the actuator rollers 33–1 and 33–2 is increased sufficiently to prevent slippage in the face of anticipated working pressures in the container 10′. This being done, a measure of the change in volume of the fluid 40′ is obtained by counting the revolutions of the shaft 52 by the counter 55. By checking the pressure at the outlet 12–2′ using the gauge 60, an accurate measure of flow from the container 10′ is obtained and the fluid system of FIG. 2 is adaptable as a constant displacement pump.

Other modifications and adaptations of the invention will occur to those skilled in the art.

I claim:
1. A constant pressure fluid system comprising
   a storage container including
      a first section, a second section,
         and an outlet port attached to said second section,
   a flexible diaphragm mounted interiorly of said container between said first section and said second section and arching from a central aperture to a mounting position with respect to said container,
   a housing attached to said diaphragm at said central aperture, a linear actuator mounted in said housing and including
- first and second blocks disposed in said housing, and a plurality of rollers angularly mounted in said blocks, a shaft rotatably mounted in said container and extending through said housing into contact with the angularly mounted rollers of said actuator, and a motor for driving said shaft, whereby the actuation of said actuator by the rotation of said shaft in engagement with said rollers causes said diaphragm to telescope into contact with the fluid stored in the second section of said container.

2. A constant pressure fluid system comprising
a storage container including
- a first section, a second section,
- and an outlet port attached to said second section, a flexible diaphragm mounted interiorly of said container between said first section and said second section and arching from a central aperture to a mounting position with respect to said container, a housing attached to said diaphragm at said central aperture, a rotatable shaft mounted in said container and extending through said housing, a motor attached to said container for driving said shaft, and a linear actuator mounted in said housing and including
- a first block and a second block disposed in said housing in encircling relationship to said shaft,
- and a plurality of rollers angularly mounted in the first and second blocks and in frictional contact with said shaft, said first block being held to said second block by spring-loaded set screws, the settings of which determine the frictional contact of said rollers with said shaft, whereby the actuation of said actuator by the rotation of said shaft in frictional contact with said rollers causes said diaphragm to telescope into engagement with the fluid stored in the second section of said container.

References Cited

UNITED STATES PATENTS

| | | | |
|---|---|---|---|
| 55,151 | 5/1866 | Neynaber | 222—386 X |
| 1,440,536 | 1/1923 | Gill | 74—194 X |
| 3,055,553 | 9/1962 | Mapes et al. | 222—95 |
| 3,174,658 | 3/1965 | Wittenberg et al. | 222—386.5 |
| 3,180,162 | 4/1965 | Yoshida | 74—194 X |
| 3,208,638 | 9/1965 | Frenzel et al. | 222—333 X |

ROBERT B. REEVES, *Primary Examiner.*

N. L. STACK, *Assistant Examiner.*